(12) United States Patent
Tschantz

(10) Patent No.: US 9,277,738 B2
(45) Date of Patent: Mar. 8, 2016

(54) LINE TENSIONER AND METHOD OF OPERATION OF THE SAME

(71) Applicant: Ronald H. Tschantz, Malvern, OH (US)

(72) Inventor: Ronald H. Tschantz, Malvern, OH (US)

( * ) Notice: Subject to any disclaimer, the term of this patent is extended or adjusted under 35 U.S.C. 154(b) by 135 days.

(21) Appl. No.: 14/177,352

(22) Filed: Feb. 11, 2014

(65) Prior Publication Data

US 2015/0223438 A1     Aug. 13, 2015

(51) Int. Cl.
*G01N 3/10* (2006.01)
*A01K 91/06* (2006.01)
*A01K 97/00* (2006.01)
*A01K 87/00* (2006.01)
*G01L 5/06* (2006.01)
*G01G 19/06* (2006.01)

(52) U.S. Cl.
CPC ............... *A01K 91/06* (2013.01); *A01K 87/007* (2013.01); *A01K 97/00* (2013.01); *G01G 19/06* (2013.01); *G01L 5/06* (2013.01)

(58) Field of Classification Search
CPC .......... G01L 5/06; G01G 19/60; G01G 19/06; A01K 91/06; A01K 97/00

USPC ............................................ 73/825, 826, 831
See application file for complete search history.

(56) References Cited

U.S. PATENT DOCUMENTS

| 4,920,680 | A | * | 5/1990 | Lindgren | 43/4.5 |
| 5,199,206 | A | * | 4/1993 | Richardson | 43/18.1 R |
| 6,339,198 | B1 | * | 1/2002 | Yamanouchi | 177/148 |
| 6,658,783 | B1 | * | 12/2003 | Yamanaka | 43/25 |

* cited by examiner

*Primary Examiner* — Max Noori
(74) *Attorney, Agent, or Firm* — Sand & Sebolt

(57) ABSTRACT

A device for determining tension in or on a line, including a housing mountable to a surface, an idler and a traveler sheave rotatably mounted on the housing, and a scale operatively engaged with the traveler sheave. A block and slot are provided on the housing. A spring disposed between the block and a portion of the housing is compressed when the block moves in a first direction and is released when the block moves in a second direction. The traveler sheave and an indicator are mounted on the block and move in unison therewith. The sheaves are aligned along the same plane and the block moves in a plane substantially parallel to the plane in which the sheaves are disposed. Markings are provided on the housing and the indicator aligns with one of these markings to indicate the tension applied to the line.

23 Claims, 9 Drawing Sheets

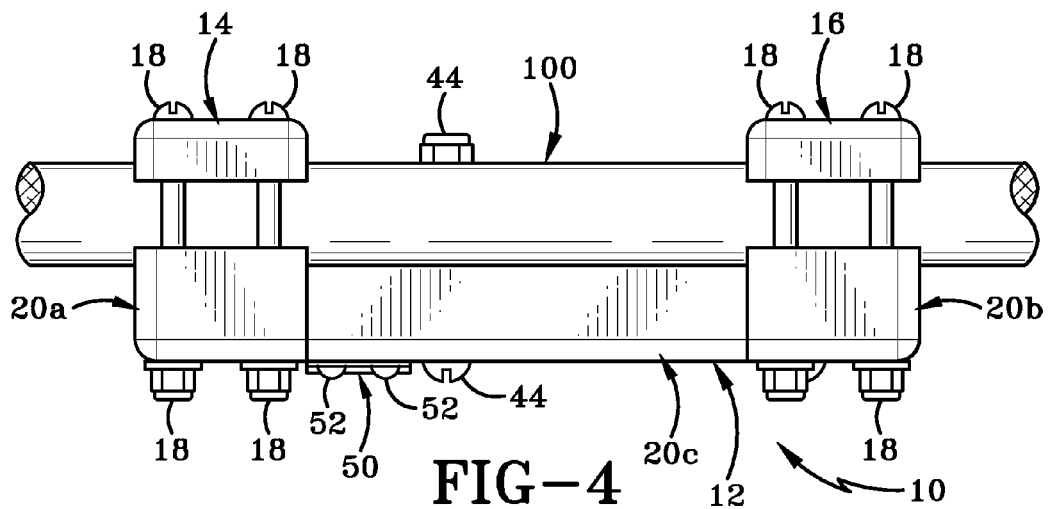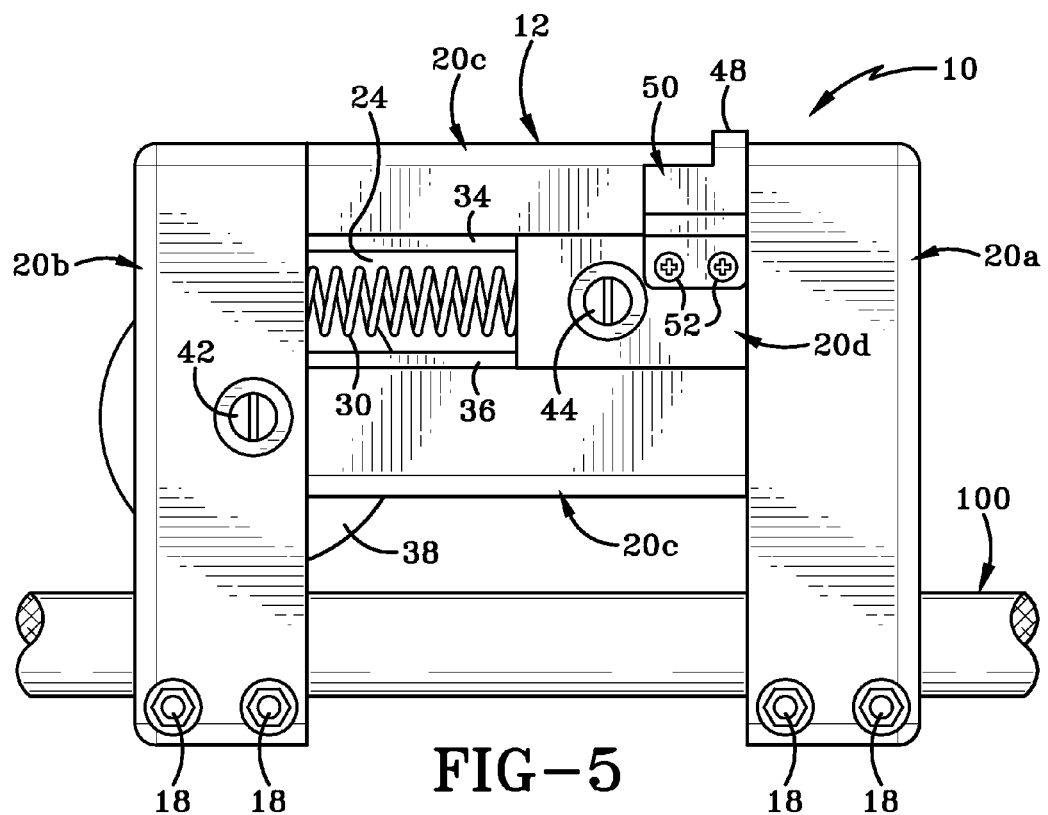

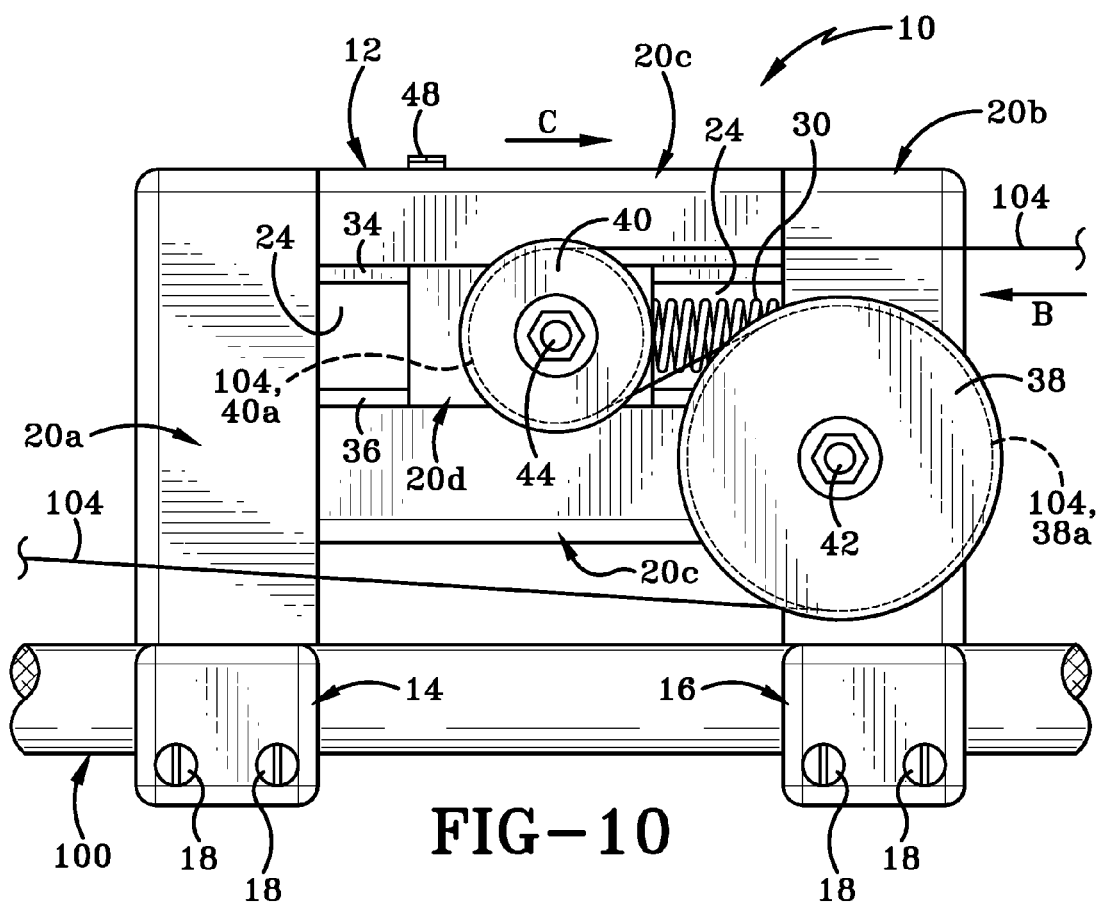
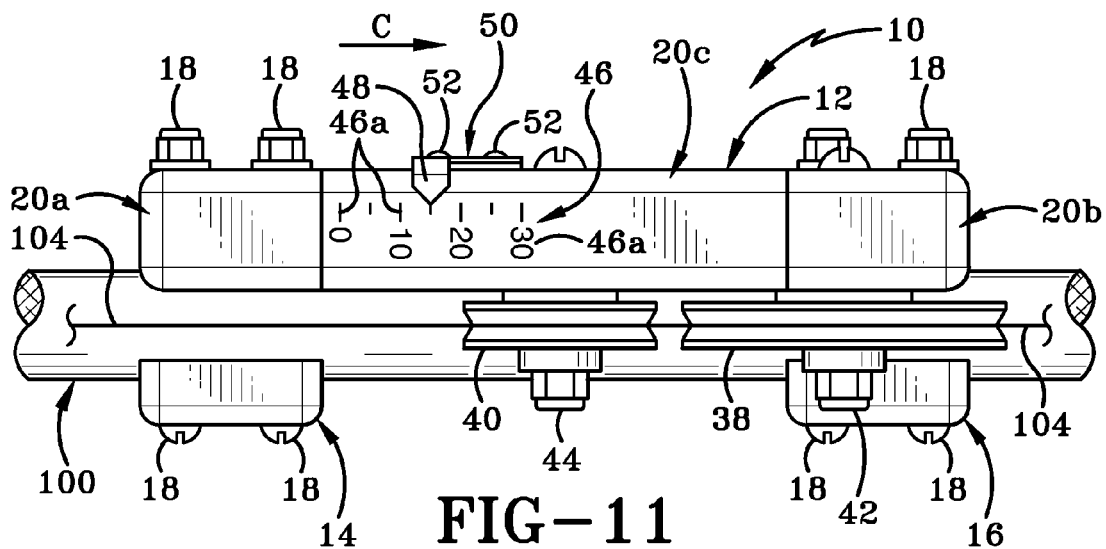

LINE TENSIONER AND METHOD OF OPERATION OF THE SAME

BACKGROUND OF THE INVENTION

1. Technical Field

This invention relates generally to sporting equipment. More particularly, this invention relates to fishing tackle. Specifically, the invention is directed to a line tensioner which preferably is mounted on a fishing rod and is selectively engageable with the fishing line extending outwardly from a reel on the rod; and which tensioner includes sheaves through which the line is reeved and a scale that indicates tension in the line.

2. Background Information

One of the most important steps a fisherman can take before going fishing is to check the strike drag on his fishing line so as to be able to apply enough line pressure to set the hook while ensuring there is less line pressure than the line-rated tensile strength. When a fish is hooked and starts to swim away, a length of line will unspool from the reel. In order to tire the fish out, the fisherman needs to have some drag on the line to make it harder for the fish to pull line off the reel. Drag is a type of braking force applied to the reel which counteracts the reel's rotation and therefore resists the unspooling of fishing line therefrom or allows line to be pulled from the reel, adjusted to not overstress line tensile strength. The fisherman can preset the amount of strike drag that will be applied to the fishing line, i.e., the drag applied to the line at the moment the fish strikes and starts to run with the bait. If the drag setting is too high, the line will barely unspool off the reel. This puts the line in danger of breaking when the fish runs. If the drag setting is too low, it will be too easy for the fish to unspool fishing line off the reel and the fish will be unlikely to tire easily.

Fishermen have typically set the strike drag on the line in one of two ways. The first way is relatively imprecise and unrepeatable in that it is set by touch or feel. What is meant by this is that the fisherman will pull a length of line off the reel and will personally sense if the line is unspooling too easily or if it is too difficult to remove the line. If the fishing line is unspooling too easily, the fisherman will change the drag setting to make it more difficult to remove line from the reel. If the line is not unspooling easily enough, the fisherman will change the drag setting to make it easier to remove the line from the reel. The problem with this methodology is that the fisherman could set the drag incorrectly and then, when a fish takes the bait and runs, the force brought to bear on the line might exceed the line's breaking strain and the line will snap. The breaking strain on a line is the force required to snap a line that is under tension. All lines have their breaking strain or tensile strength printed on their packaging. The fisherman will select a line based on its diameter and/or breaking strain and which corresponds generally to the typical weight of fish that they are trying to catch.

The second method for setting strike drag is to secure the free end of the fishing line to a spring balance. One such type of spring balance would be a scale that is typically used to weigh fish by suspending them from a hook provided on the scale. The end of the fishing line is tied into a loop and is engaged with the hook on the spring balance. If the fisherman has to do this procedure alone, he or she will secure hold the rod in one hand and will pull down on the spring balance (which is connected to the fishing line) to the point that the ratchet on the reel starts to slip. This point is easily determined as it is the moment at which the ratchet starts to make a sound (caused by the reel brake starting to slip) when the line is pulled down by the spring balance. At that point, the fisherman will look at the reading on the scale and determine if it is an acceptable measurement relative to the breaking strain on the line. The reading on the scale is desirably less than or equal to the breaking strain of the line. (If a second person is assisting the fisherman, then the fisherman will hold the rod and the assistant will pull down on the fishing line and take a reading on the spring balance.) A typical desirable relationship between the breaking strain and the force applied by pulling down on the fishing line is about 20-30% of the breaking strain. So, for instance, if the fishing line breaking strain is 30 lb, then a measurement on the spring balance of from about 6 lbs to about 9 lbs when the reel is full of fishing line would be a suitable strike drag setting. If the line has a 30 lb breaking strain and the reading on the spring balance is around 2 lbs, for example, then the fisherman knows he or she needs to increase the drag setting. If the reading on the spring balance is around 15 lbs, for example, then the drag setting on the reel will be reduced.

While this second method enables the fisherman to preset the drag to a desired degree, the methods described above have to be done prior to heading out to fish and they still require time and effort to be expended to achieve the correct drag setting. There is therefore still a need in the art for an improved device and method for setting the strike drag or tension on a fishing line which enables a fisherman to do so quickly and in a repeatable manner and at any time, without undue experimentation and time expenditure.

SUMMARY

In one aspect, the invention may provide a device for determining the tension in or on a line; said device comprising: a housing adapted to be mounted to a surface; an idler sheave rotatably mounted in a first location on the housing; a traveler sheave rotatably mounted in a second location on the housing; and a scale operatively engaged with the traveler sheave; wherein the device is adapted to have the line reeved around the idler sheave and the traveler sheave.

The housing may include a slot defined within the housing and a block disposed within the slot. The block is movable within the slot between a first position and a second position. The traveler sheave is mounted on the block and moves in unison with the block between the first and second positions. Preferably, the idler sheave and traveler sheave are aligned along the same plane and when the block moves between the first and second directions, the block moves in a plane that is substantially parallel to the plane in which the idler and traveler sheaves are disposed.

The housing may further include a replaceable certified spring with different compressive strength disposed within the slot and positioned to be compressed when the block moves from the first position to the second position and to return to its original shape when the block moves from the second position to the first position. The scale includes a plurality of markings provided on an exterior region of the housing. A indicator is operatively engaged with the block on which the traveler sheave is mounted. The indicator thus moves in one of the first direction or the second direction relative to the markings when the block and traveler sheave move relative to the housing. A mounting assembly is provided on the housing and this mounting assembly secures the housing to the surface, such as a rod, fishing rod holder, a wall or some other mounting surface. The mounting assembly includes a first mounting member secured to the housing by a fastener and movable toward and away from the housing. The first mounting member is configured to clamp the surface to which the housing is mounted between the housing and the first mounting member when the first mounting member is moved toward the housing. The first mounting member releases the surface when the first mounting member is moved away from the housing. Each of the mounting member and the surface of the housing opposite the same include recesses, preferably arcuate recesses, and protective pads are applied therein so that the pads engage the surface to which the holder is attached. Preferably, one or more rails are provided on a section of the housing or on the movable block to resist lateral motion in block and to ensure the movable block glides easily thereover during use of the tensioner.

In accordance with another aspect, the invention may provide in combination a line and a tensioner configured to have a section of the line reeved therewith, wherein said tensioner comprises:

a housing adapted to be mounted to a surface;

an idler sheave rotatably mounted in a first location on the housing;

a traveler sheave rotatably mounted in a second location on the housing; and a scale operatively engaged with the traveler sheave; and wherein the line is reeved around the idler sheave and the traveler sheave.

It should be noted that the sheave diameters may also be changed for higher tensioned line to prevent excessive radial bend pressure to the line.

Preferably, the line is reeved sinusoidally around the idler sheave and the traveler sheave. The housing includes a block and a slot defined within the housing. The block is disposed within the slot and is movable therein between a first position and a second position. The traveler sheave is mounted on the block moves in unison with the block between the first and second positions. The idler sheave and traveler sheave are aligned along the same plane and the block moves between the first and second directions in a plane that is substantially parallel to the plane in which the idler and traveler sheaves are disposed.

In another aspect, the invention may provide a method of determining the tension in a line or of fixing the drag applied by a reel upon which a portion of the line is wound, and wherein said method comprises the steps of:

reeving a length of the line around a traveler sheave and an idler sheave of a tensioning device;

winding a length of reeved line onto the reel;

watching an indicator on a scale operatively connective to the traveler sheave as the reeved line is wound onto the reel;

determining, from a position of the indicator on the scale, a maximum tension achieved when the reeved line is wound onto the reel;

comparing the maximum tension achieved with a breaking strain of the reeved line; and setting a drag device on the reel to cause the maximum tension to be at or lower than the breaking strain of the line.

The step of winding a length of reeved line onto the reel helps to prevent pre-tension of the line, aids in removing any tangles or kinks in the line before being wound onto the reel spool, and helps shed water or debris from the line as it is wound onto the reel spool. Typically, when line is reeled in and wound onto the reel spool, the line is wet from being in the water. The line then dries on the spool and this tends to cause the line to shrink, tighten and take a set. The line tensioner disclosed herein helps to prevent pre-loading tension of the line on a spool within a reel, reduces shrinkage and tightening of the line as it dries because the line is not over-tensioned onto the spool, and because water is stripped from the line as it passes through the tensioner.

The method may further include the step of mounting the tensioning device on a surface by engaging a mounting assembly provided on the housing with one of a fishing rod, an eyelet on a fishing rod, a fishing rod holder or a wall. The tension or drag is set one of prior to casting the line using the rod; after casting the line using the rod; or while fishing.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

FIG. 2 is an enlarged right side view of the line tensioner engaged on the rod and illustrated without the fishing line being threaded there through;

FIG. 4 is a bottom view of the line tensioner on the rod shown in FIG. 2;

FIG. 5 is a left side view of the line tensioner on the rod shown in FIG. 2;

FIG. 10 is a right side view of the line tensioner with fishing line threaded there through and with the tensioner in a first position;

FIG. 11 is a top view of the line tensioner on the rod as shown in FIG. 10;

Similar numbers refer to similar parts throughout the drawings.

DETAILED DESCRIPTION

Figure 1:
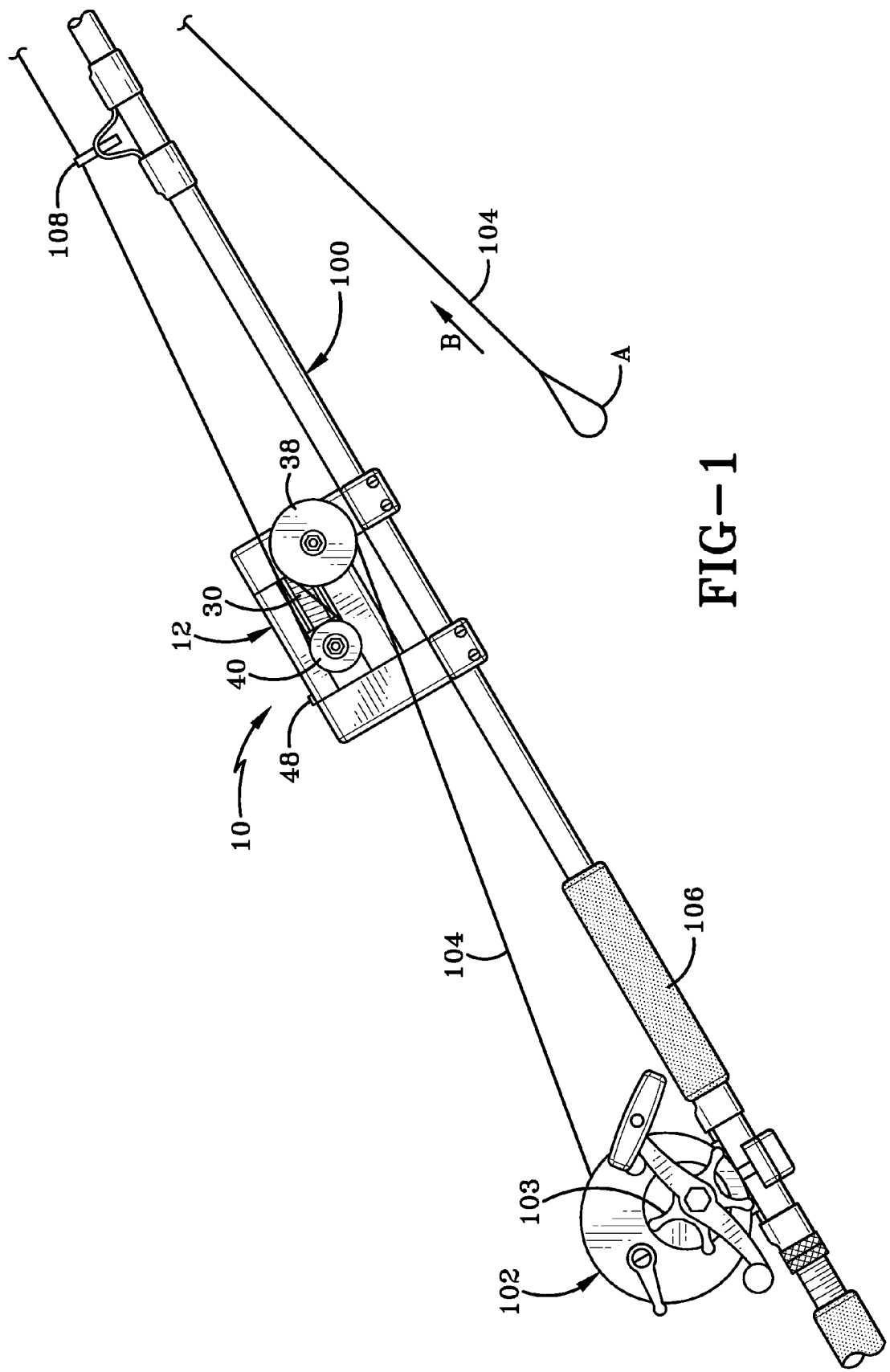
FIG. 1 is a right side view of a line tensioner engaged on a fishing rod.
Figure 2:
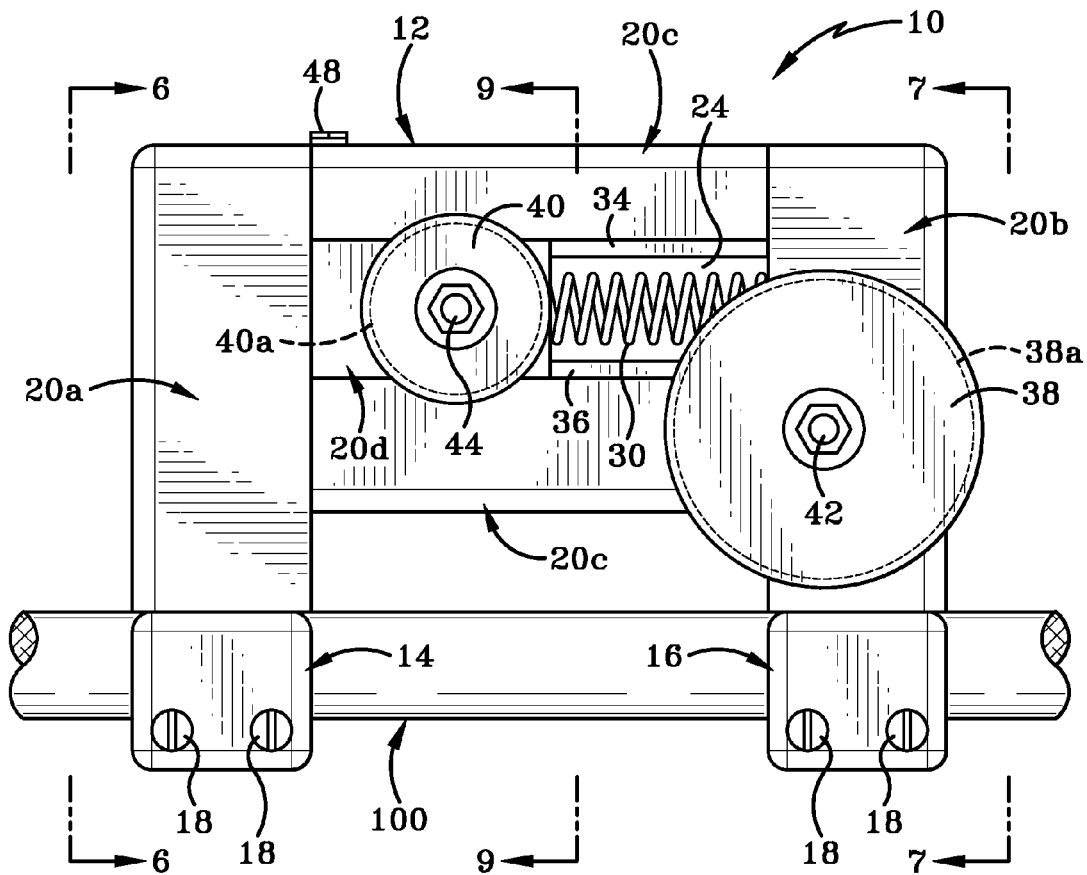

Referring to FIGS. 1-12, there is shown a line tensioner in accordance with an aspect of the present invention, generally indicated at 10. Tensioner 10 is configured for use in conjunction with a fishing rod 100 upon which is mounted a reel 102 having a length of fishing line 104 wound thereon. (It will be understood that any type of reel may be used in conjunction with line tensioner 10 and the reel shown in the attached figures is by way of example only.) Tensioner 10 preferably is removably engaged with a portion of rod 100 and is positioned a short distance upwardly away from the handle 106 and downwardly from the lowermost eyelet 108. Tensioner 10 enables a fisherman to adjust the drag on reel 102 so that it more or less matches, or is less than, the designated breaking strain of fishing line 104. Line 104 is sinusoidally reeved over portions of tensioner 10, as will be described hereafter, in order to set the drag on reel 102 and thereby the tension in line 104.

In accordance with an aspect of the invention, line 104 may be reeved over portions of tensioner 10 before line 104 is cast, after line 104 has been cast and even while actively fishing In addition to enabling the fisherman to correctly set the drag on line 104, tensioner 10 is also able to act as an in-line shock absorber while fishing. Tensioner helps to minimize or prevent over-tensioning of line 104 and thus helps reduce the likelihood that line 104 will break during a fish strike.

Referring still to FIGS. 1-11, tensioner 10 includes a housing 12 that is selectively engageable with rod 100 by way of clamping members 14, 16, and fasteners 18. Clamping members 14, 16 may take a variety of different forms. As illustrated, each clamping member 14, 16 preferably is a separate block that is engaged with housing 12 by fasteners 18. Each clamping member 14, 16 defines an arcuate recess 15 therein. Each clamping member 14, 16 is movable toward and away from the rest of housing 10. Although not illustrated herein, each clamping member 14, 16 may further include a protective pad which will line the arcuate recess 15. The pad will therefore be disposed adjacent the exterior surface of rod 100 so that member 14, 16 will not damage the same during engagement of line tensioner 10 with rod 100. It will be understood that any other style or configuration of clamping member 14, 16 may be utilized for securing line tensioner 10 to rod 100.

Figure 8:
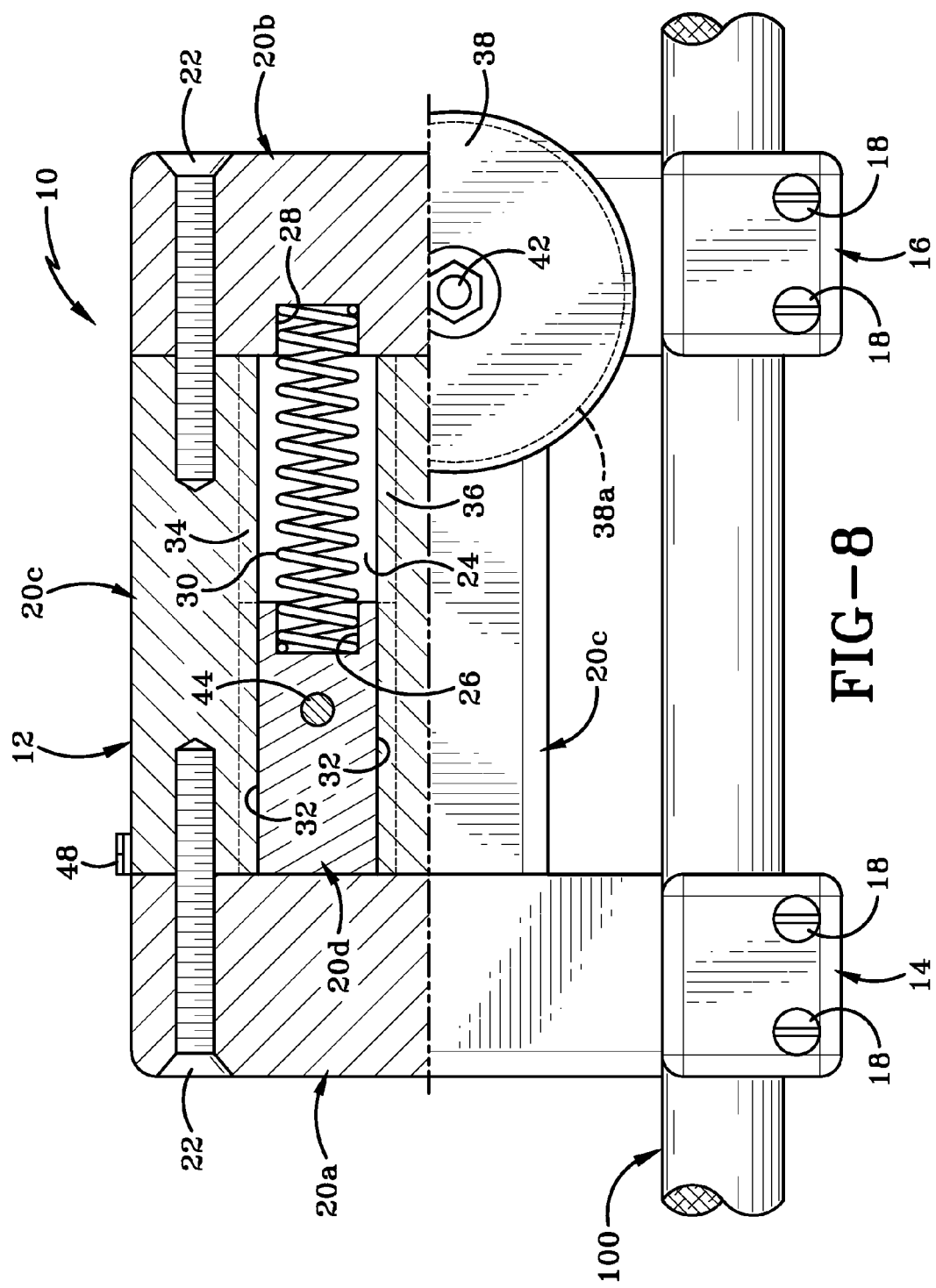
FIG. 8 is a partial cross-sectional view of the line tensioner on the rod.

As best seen in FIG. 8, housing 12 comprises a plurality of blocks 20a, 20b, 20c, and 20d. Blocks 20c are centrally located and blocks 20a and 20b are positioned on either side of blocks 20c and are secured thereto by fasteners 22. Blocks 20c are disposed generally at right angles to blocks 20a and 20b. Each of blocks 20a and 20b defines an arcuate recess 17 adjacent their lower surfaces. Recesses 17 are configured to be aligned with recesses 15 in clamping members 14, 16. Recesses 17 may be lined with a protective pad in much the same manner as recesses 15. Rod 100 is received between blocks 20a, 20b and the respective clamping members 14, 16. Fasteners 18 are utilized to keep blocks 14, 16 urged toward blocks 20a, 20b and in clamping engagement with the exterior surface of rod 100, for example.

Figure 9:
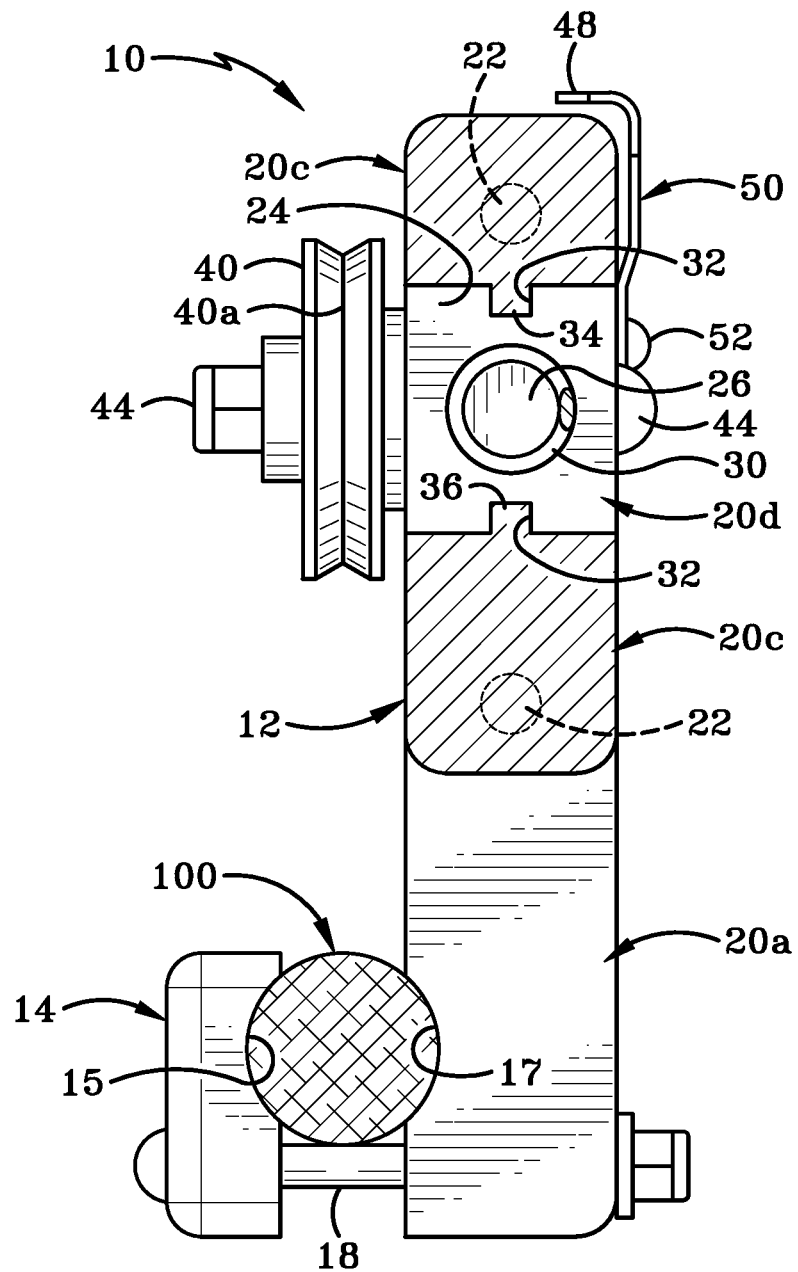
FIG. 9 is a front cross-sectional view of the line tensioner on the rod taken along line 9-9 of FIG. 2.

Blocks 20c define a slot 24 between them and block 20d is positioned within this slot 24. A notch 26 (FIG. 8) is formed in block 20d and a notch 28 is formed in block 20b. Notch 26 is horizontally aligned with notch 28 relative to blocks 20a, 20b. A spring 30 is positioned within slot 24 and a first end of spring 30 is engaged within notch 26 and a second end of spring is engaged within notch 28. Preferably, the spring 30 used in tensioner 10 is a certified or otherwise calibrated spring. Spring 30 is appropriately secured in both notched regions 26, 28. FIG. 9 shows that notches 32 are also formed in the upper and lower surfaces of block 20d. A boss 34 provided on the uppermost portion of upper block 20c is received in the upper notch 32, and a boss 36 provided on the lowermost portion of lower block 20c is received in the lower notch 32. This interlocking engagement of blocks 20c and 20d helps secure the blocks together and prevents lateral motion between blocks 20c and block 20d. Furthermore, these bosses 34, 36 form "rails" along which block 20d is able to slide as spring 30 is compressed and then released during operation of tensioner 10, as will be hereinafter described.

It will be understood that the notches 32 could, instead, be formed in upper and lower blocks 20c and the bosses provided on upper and lower surfaces of block 20d. Furthermore, it should be understood that while two blocks 20c are described herein as defining slot 24 between them, tensioner 10 may, alternatively, include one single larger block disposed between blocks 20a, 20b and this single block could defines a slot therein within which block 20d is disposed. Still further, blocks 20a, 20b and 20c could form part of one single even larger block that defines a slot therein and in which movable block 20d is disposed. Any other suitable arrangement could also be employed.

Figure 3:
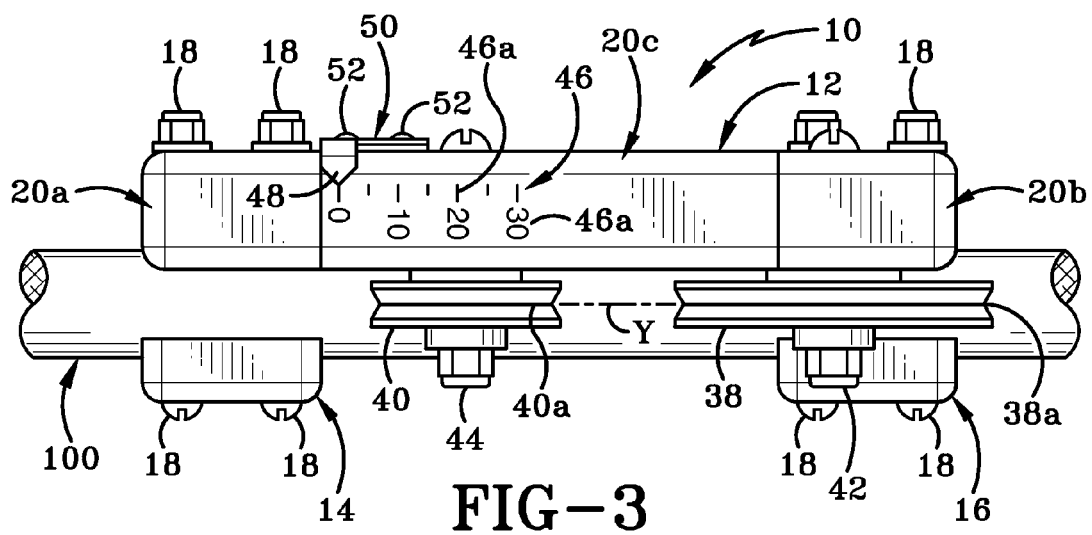
FIG. 3 is a top view of the line tensioner on the rod shown in FIG. 2.
Figure 6:
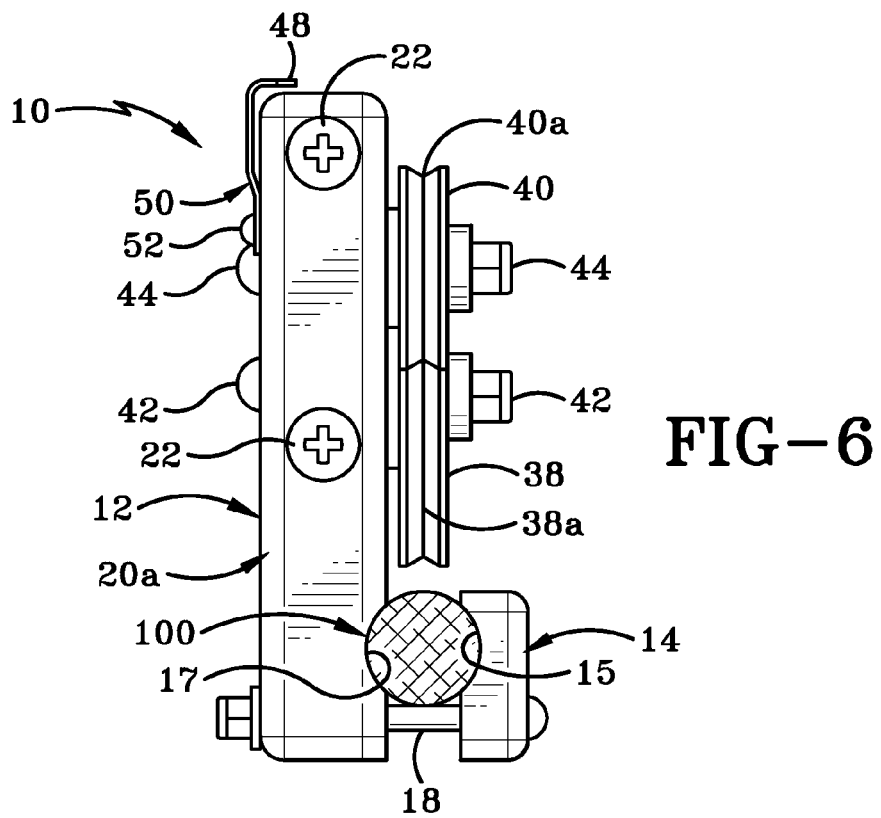
FIG. 6 is a rear view of the line tensioner on the rod taken along line 6-6 of FIG. 2.
Figure 7:
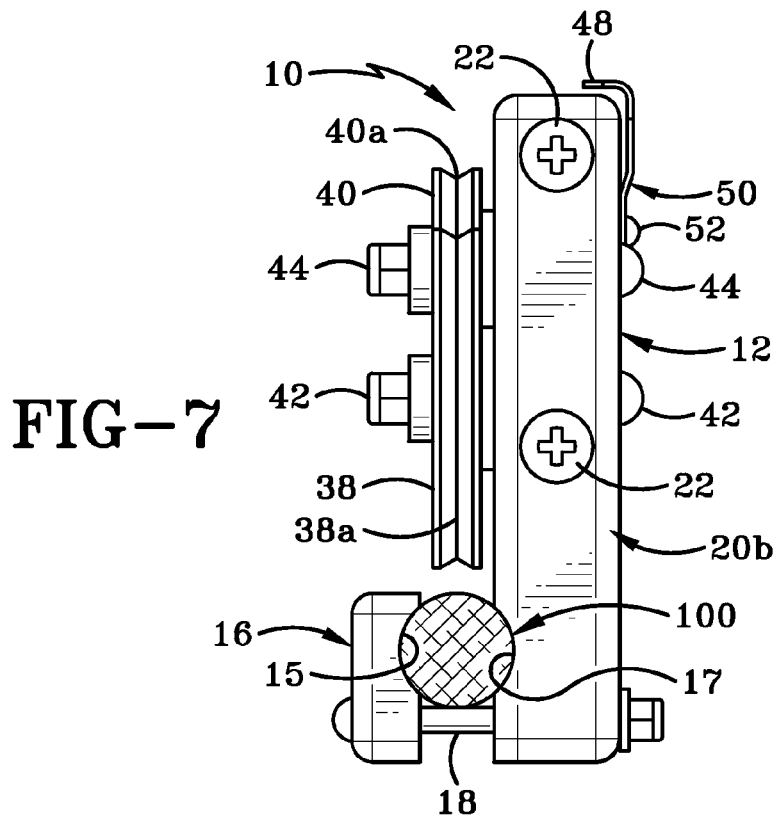
FIG. 7 is a front view of the line tensioner on the rod taken along line 7-7 of FIG. 2.

An idler sheave 38 and a traveler sheave 40 are mounted on housing 12. Preferably, idler sheave 38 is mounted on block 20b and traveler sheave 40 is mounted on block 20d. Each of sheaves 38, 40 is secured to their respective blocks 20b, 20d by a fastener 42, 44. Idler sheave 38 rotates about an axis extending along the length of fastener 42 and traveler sheave 40 rotates about an axis extending along the length of fastener 44. Each of the idler sheave 38 and traveler sheave 40 includes a generally V-shaped circumferential groove 38a, 40a defined therein and which is configured for receiving line 104 therein. The shape of groove 38a, 40a helps keep line 104 retained on the associated sheave. As shown in FIG. 3, idler sheave 38 and traveler sheave 40 are aligned along the same plane (identified by the reference character "Y") and the grooves 38a, 40a therein are also aligned with each other in this plane. This arrangement helps to ensure that line 104 will be traveling in the same plane "Y" when the drag on the reel 102 is set and the tension in line 104 is measured. When traveler sheave 40 moves in response to tension in fishing line 104, spring 30 is compressed or returns to its original length, as will be described hereafter.

In accordance with an aspect of the invention a scale 46 is provided on an outer surface of block 20c of housing 12. As illustrated herein, scale 46 is provided on an uppermost surface of block 20c but any other surface that is suitable could be used instead. In particular, scale 46 is positioned so that it is easily viewed by the fisherman during use of rod 100. Scale 46 includes a plurality of markings 46a which may be used to determine the drag or tension on line 104. An indicator 48 is provided to selectively align with one of the markings 46a on scale 46 during use of tensioner 10. As best seen in FIG. 5, indicator 48 is part of an indicator assembly 50 which is secured to block 20d by fasteners 52. As block 20d travels with traveler sheave 40, indicator assembly 50 and therefore indicator 48 moves in unison with block 20d. Block 20c, on the other hand is stationary. Thus, when indicator 48 moves with block 20d, the indicator 48 will align with a different one of the markings 46a on scale 46 and thereby identify the tension which line 104 is under. This will be further described herein.

It will be noted that idler sheave 38 and traveler sheave 40 are accessible in that they extend outwardly from a surface of housing 12—they preferably are not covered by any other part of tensioner 10. This ensures that the fisherman is able to reeve or thread the line 104 around sheaves 38, 40 in the manner indicated in FIGS. 10-11 after casting line 104 or which actively fishing. (Of course, housing 10 could be provided with some type of pivotal door that can be opened to permit access to sheaves 38, 40 so that line 104 could be reeved therein; and where the door would subsequently be closed to keep sheaves 38, 40 and line 104 from being accessed.) Reeving of the line 104 can be undertaken prior to casting so that the drag on reel 102 can be set before fishing The line 104 is reeved into tensioner 10 to preset the drag on reel 102 to be less than or equal to the breaking strain of the line 104. Alternatively, line 104 can be reeved in tensioner 10 immediately after casting the line 104 or even during fishing. This enables the fisherman to determine the tension on the line 104 while actually fishing and to make adjustments to the drag applied by reel 102 if necessary. As tension in line 104 increases, traveler sheave 40 moves in a first direction and will compress spring 30. As tension in line 104 decreases, traveler sheave 40 moves in a second direction, allowing spring 30 to return to its original length. This will all be described further herein.

Line tensioner 10 may be configured to be mounted on a rod 100 or be mounted on a wall 110 (FIG. 12), a fishing rod holder 112 (FIG. 13), or any other desired surface. If line tensioner 10 is mounted on wall 110 it may be permanently secured thereto by fasteners (not shown) or by an adhesive. This type of mounting would be done in a workshop, garage or fishing shack, for example, and would be used to preset drag on reel 102 prior to a fishing expedition. If line tensioner 10 is mounted on a fishing rod holder 112 then the drag on reel 102 may be set prior to casting, immediately after casting or even while actively fishing. Fishing rod holder 112 as illustrated in FIG. 13 is of a type that typically is mounted on a boat 113. Alternatively, it may be a type of holder is anchored in the sand. Tensioner 10 may be secured to holder 112 in much the same manner that tensioner 10 is secured to rod 100, i.e., by clampingly engaging holder 112 with clamping members 14 and 16. Alternatively, fasteners 54 (FIG. 13) may be used to directly secure regions of tensioner 10 to holder 112.

Line 104 may be reeved through line tensioner 10 before rod 100 is seated in holder 112 or after rod 100 is seated in holder 112. FIG. 13 shows rod 100 seated in holder 112 with line 104 reeved through tensioner 10 and line 104 extending into the boat 113. In this position, line 104 may be pulled downwardly further into the boat to set the drag on reel 102. If line 104 is engaged in tensioner 10 while fishing (which is not shown in FIG. 13), tensioner 10 may act as an in-line type of shock absorber and will aid in preventing over-tensioning/breakage in the line 104 if a strike occurs while the fisherman is not actively holding rod 100. Line over-tensioned as it is being spooled/loaded onto the spindle within the reel may cause the line to elongate and become overstressed as additional line is spooled onto line already spooled onto the reel. If the reel and line is only used again some time later after the line has dried (from being wet in the water), the stress in the dried line may cause the line to become weakened or more prone to breakage when it is subsequently used.

Although not illustrated herein, it will be understood that tensioner 10 may alternatively be clamped (using one of clamping members 14, 16) to one of the eyelets 108 on rod 100 and be removed when the tension in line 104 has been measured and the drag appropriately adjusted to be less than or equal to the breaking strain of line 104.

Referring to FIGS. 1, 10 and 11, line tensioner 10 is used in the following manner. Line tensioner 10 is engaged with rod 100 (FIG. 1), or wall 110 (FIG. 12), or fishing rod holder 112 (FIG. 13). In the case of rod 100, the fasteners 18 are disengaged from clamping members 14 and 16. Rod 100 is positioned in the recesses 17 in blocks 20a, 20b of tensioner 10. Clamping member 14 is positioned adjacent rod 100 so that the holes (not shown) in block 20a and clamping member 14 for fasteners 18 are aligned with each other; and then fasteners 18 are inserted into these holes and are tightened. Similarly, clamping member 16 is positioned adjacent rod 100 so that the holes (not shown) in block 20b and clamping member 16 are aligned and fasteners 18 are inserted through the aligned holes and fastened in place. At this point, line tensioner 10 is engaged with rod 100. Line 104 extends outwardly from reel 102, through eyelet 108 and subsequent eyelets (not shown) until line 104 extends through all of the eyelets. A weight, hook and bait (none of which is illustrated herein) may be engaged with a free end of line 104.

In accordance with an aspect of the invention, a portion of line 104 is reeved through tensioner 10 by passing it around traveler sheave 40 and idler sheave 38 in the manner shown in FIGS. 10-11. The portion of line 104 may be disposed between reel 102 and eyelet 108 (if line 104 has been cast out or if has not yet been cast out), or the portion of line 104 may be part of the line which extends outwardly from the tip (not shown) of rod 100 (if the line has not yet been cast out and preferably prior to engagement of a hook therewith). When reeved through sheaves 38, 40, line 104 settles into the apex of the respective V-shaped grooves 40a, 38a of sheaves 40, 38. It will be understood that different diameter sheaves having differently configured grooves therein may be used so as to accommodate different size lines and thereby reduce the possibility for overstress of the line based on a minimum diameter for spooling. Preferably, sheaves 38, 40 will be sized so that the diameter thereof is large enough to have a sufficient line bend radius so as not cause external stress in the line and thereby damage the same.

Once line 104 is reeved through tensioner 10, a lever 103 on reel 102 is moved to a position where it applies some drag to the line 104. The fisherman holds the line 104 at a position after it has exited tensioner 10, such as at the point "A" indicated on FIG. 1. The line 104 is then reeled in by the fisherman in the direction of arrow "B" to cause line 104 to be pulled through tensioner 10 and wound onto reel 102. As the tension on line 104 increases, the line 104 reeved around traveler sheave 40 causes the sheave 40 and the associated block 20d to be drawn in the direction of arrow "C" (FIG. 10). This motion compresses spring 30 in the manner shown in FIG. 10. Since the indicator 48 is fixedly engaged with block 20d, as the block 20d moves in the direction of arrow "C", the indicator 48 moves in unison therewith. The fisherman is therefore able to determine the tension in the line 104 by observing scale 46 (FIG. 11) and seeing what marking 46a indicator 48 aligns with. The drag on reel 102 should be adjusted so that the marking 46a on tensioner 10 is caused to be comparable in size or is less than the breaking strain of line 104.

Thus, in the instance illustrated in FIG. 11, the marking 46a aligned with indicator 48 is 15—representing 15 lbs. If the breaking strain on the line is 40 lbs then the drag on reel 102 is set at a point where the reel 102 will permit line 104 to be drawn of reel 102 when the tension generated in line 104 is at 15 lbs. Obviously this is less than the breaking strain of line 104, which is 20 lbs. Thus, if a fish takes the bait and strikes, the drag on line 104 applied by reel 102 and tensioner 10 will be less than 40 lbs and thus reduce the tendency of the line 104 to snap. If, on the other hand, the breaking strain on line 104 is 10 lbs, then the drag placed on line 104 by reel 102, if set at 15 lbs, is greater than the breaking strain of line 104. Thus, if a fish strikes, the line 104 will be at risk of breaking.

The fisherman is able to adjust the drag applied to line 104 by reel 102 by changing the position of lever 103 on reel 102. After an adjustment to the lever's position has been made, line 104 is again reeled in the direction of arrow "B" to cause line 104 to move through tensioner 10, forcing traveler sheave 38 and therefore block 20d to move. Block 20d slides along "rails" 34, 36 and the block's movement is thereby kept smooth and substantially parallel to plane "Y". The position of indicator 48 relative to markings 46a is observed and the marking aligned with indicator is noted and compared to the identified breaking strain of line 104. As indicated above, the fisherman will make the necessary relative adjustments to set the drag on reel 102 until the marking 46a aligned with indicator 48 is at least at or below the breaking strain of line 104. When line 104 is no longer moved in the direction of arrow "B", spring 30 returns to its normal size/position, moving block 20d in the opposite direction of arrow "C" and indicator 48 therefore will move towards the marking 46a which represents zero tension on line 104.

Tensioner 10 may be used in a different manner. In this second and different manner, line 104 is pulled outwardly off reel 102 in the direction opposite to arrow "B". The pulling movement causes line 104 to be pulled through tensioner 10 and causes traveler sheave 38 and therefore block 20d that sheave 38 is operatively engaged with, to move in the direction of arrow "C" (FIG. 10). The movement of block 20d causes spring 30 to be compressed and simultaneously causes indicator 48 to align with one of the markings 46a on scale 46. The lever 103 (FIG. 1) is adjusted until the ratchet sounds when the line 104 is pulled through tensioner 10 and the indicator 48 is aligned with a marking 46a which signifies a tension that is less than the breaking strain of the line 104. Necessary adjustments can then be made to set the drag on reel 102 so that the tension in the line 104 will not exceed the breaking strain of line 104.

Once the correct drag/tension has been set the fisherman has a choice. Line 104 may be removed from tensioner 10 or line 104 may remain reeved in tensioner 10. If line 104 is removed from tensioner 10 then rod 100 is used in the customary manner, if line 104 is allowed to remain in tensioner 10, then rod is used in the customary manner but tensioner 10 will act as a type of shock absorber if a fish strikes. Tensioner 10 may act as a shock absorber because if a fish strikes and suddenly pulls line in the opposite direction to arrow "B", the initial shock of the strike is absorbed by block 20d being moved by line 104 and compressing spring 30.

Figure 12:
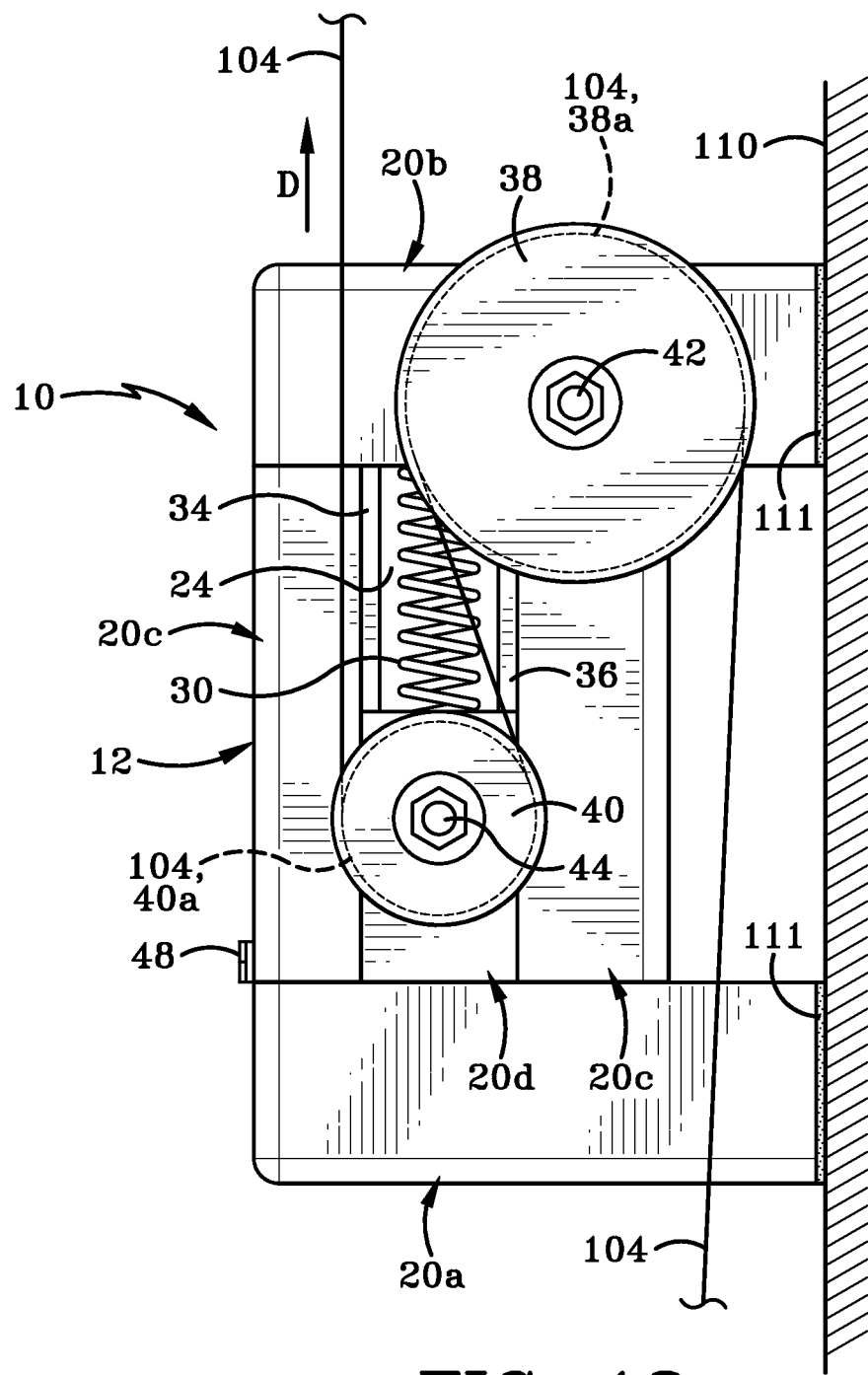
FIG. 12 is a right side view of the line tensioner shown secured on a vertically oriented wall.
Figure 13:
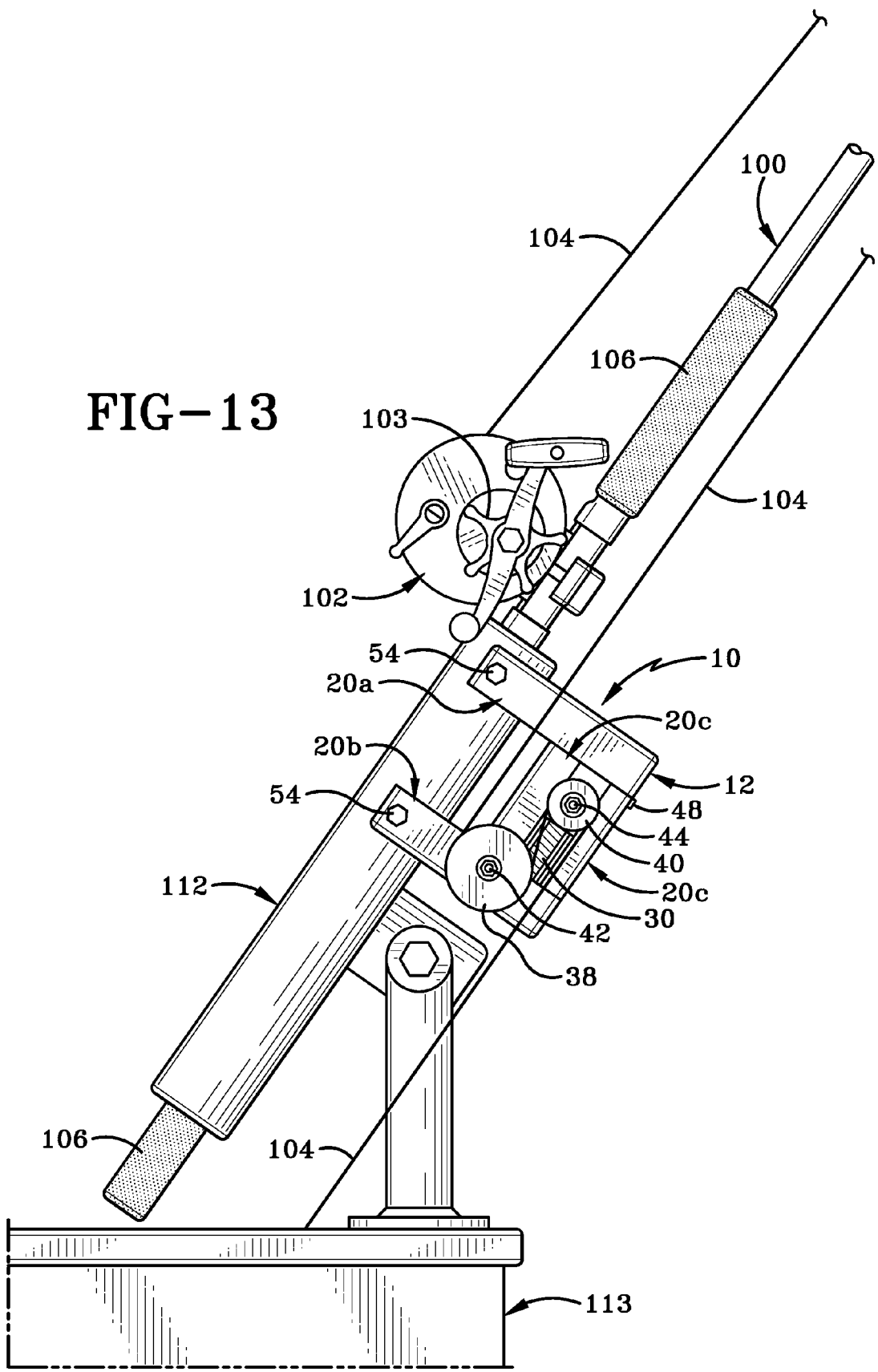
FIG. 13 is a right side view of the line tensioner shown secured to a fishing rod holder.

FIG. 12 shows a tensioner 10 mounted on a wall 110. Line 104 extends outwardly from a reel (not shown and is reeved through tensioner 10. When it is desired to set the tension in line 104, line 104 is pulled in the direction of arrow "D" and the indicator 48 adjacent the scale (not shown) is used to determine the tension being applied to line 104 when the drag in the reel is set at a first position. Adjustments to the drag applied by reel 102 are made accordingly. Tensioner 10 as illustrated in FIG. 12 is thus utilized in the same manner as the tensioner 10 shown in FIGS. 1-11. It is simply the manner of mounting tensioner that differs. Tensioner 10 is mounted on wall 110 by applying a layer of adhesive 111 between wall 110 and ends of blocks 20a, 20b. Alternatively, flanges (not shown) or the like may be provided at the ends of blocks 20a, 20b and fasteners may be used to secure those flanges to wall 110. Any other suitable means of securing tensioner 10 to a vertical, horizontal, or inclined wall 110 may be employed.

FIG. 13 shows tensioner 10 mounted on a fishing rod holder 112 that is in turn mounted on a boat 113. Tensioner 10 is secured to holder 112 by fasteners 54 which extend through portions of the tensioner 10 and into holder 112. Tensioner 10 illustrated in FIG. 13 is used in the same manner as tensioner 10 shown in FIGS. 1-11.

It will be understood that a tensioner similar to tensioner 10 may be used in a variety of other applications where cables, such as electrical wires or block and tackle type arrangements, have to be tensioned to a particular degree. The tensioner used in such other applications may be much larger and able to withstand greater forces being applied to the cable but the tensioner itself will operate in the same manner as described herein.

It will be understood that tensioner may include other components such as guides provided in locations on blocks 20a, 20b, 20c to prevent line 104 from slipping off tensioner or becoming disengaged from traveler sheave 38 or idler sheave 38. Such guides could take the simplest form of a hook-type component where the line 104 is threaded through a gap between the hook and the tensioner housing. Such guides will hold line 104 substantially aligned along plane "Y" with traveler and idler sheaves 38, 40.

It will be understood that the scale utilized in tensioner 10 may take other forms that includes but is not limited to load cells.

Other components may be included as part of line tensioner 10. For example, the device may include some type of light source that will illuminate the scale 46, and/or will illuminate the face of the housing upon which traveler sheave 38 and idler sheave 40 are mounted. In both of these instances the light source will provide light so that the fisherman can see the markings on the scale and thereby determine the tension on the line 104; or will provide light so that the fisherman is able to correctly reeve line 104 with sheaves 38 and 40. A light source may further or alternatively be provided which will illuminate the line extending outwardly from tensioner 10 and toward a tip of the rod 100. This light source would be supplied for the purpose of being able to see the end or tip of the rod when a fish strikes during night-time fishing. The device may further include an alarm—visual or audible or both—to alert a fisherman to the fact that a fish strike has occurred. This alarm is particularly useful if the rod 100 is to be placed into a rod-holder such as holder 112.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A device for determining the tension in a line; said device comprising:
   a housing adapted to be mounted to a surface; wherein the housing includes:
      a block;
      a slot defined within the housing and wherein the block is disposed within the slot and is movable therein between a first position and a second position;
   an idler sheave rotatably mounted in a first location on the housing;
   a traveler sheave rotatably mounted in a second location on the housing; said traveler sheave being mounted on the block; and wherein the traveler sheave moves in unison with the block between the first and second positions; and
   a scale operatively engaged with the traveler sheave; and wherein the device is adapted to have the line reeved around the idler sheave and the traveler sheave.

2. The device as defined in claim 1, further comprising rail provided on one of the housing and the movable block; and a recess defined in the other of the housing and the movable block; and the rail is received in the recess; and wherein the movable block moves between the first and second positions on the rail.

3. The device as defined in claim 1, wherein the idler sheave and traveler sheave are aligned along the same plane; and wherein the block moves between the first and second directions in a plane that is substantially parallel to the plane in which the idler and traveler sheaves are disposed.

4. The device as defined in claim 3, wherein the scale further comprises:
   a spring disposed within the slot and positioned to be compressed when the block moves from the first position to the second position; and wherein the spring returns to its original shape when the block moves from the second position to the first position.

5. The device as defined in claim 4; further comprising wherein the scale includes a plurality of markings provided on an exterior region of the housing; and an indicator operatively engaged with the block on which the traveler sheave is mounted; and wherein the indicator moves in one of the first direction or the second direction relative to the markings when the block and traveler sheave move relative to the housing.

6. The device as defined in claim 1, further comprising a mounting assembly provided on the housing; said mounting assembly being adapted to secure the housing to the surface.

7. The device as defined in claim 6, wherein the mounting assembly includes at least a first mounting member secured to the housing by a fastener; wherein the at least the first mounting member is movable toward and away from the housing and is adapted to clamp the surface to which the housing is mounted between the housing and the at least the first mounting member when the at least the first mounting member is moved toward the housing; and the at least the first mounting member releases the surface when the at least the first mounting member is moved away from the housing.

8. A device for determining the tension in a line; said device comprising:
    a housing adapted to be mounted to a surface;
    an idler sheave rotatably mounted in a first location on the housing;
    a traveler sheave rotatably mounted in a second location on the housing;
    a scale operatively engaged with the traveler sheave; and wherein the device is adapted to have the line reeved around the idler sheave and the traveler sheave; and
    a mounting assembly provided on the housing; said mounting assembly being adapted to secure the housing to the surface; wherein the at least a first mounting member of the mounting assembly defines a first recess therein and the housing defines a second recess therein; and the first and second recesses are disposed opposite each other; and the surface to which the housing is secured is received at least partially within the first and second recesses when the at least the first mounting member is moved toward the housing.

9. The device as defined in claim 8, wherein each of the first and second recesses is arcuate.

10. The device as defined in claim 8, further comprising a first protective pad positioned within the first recess and a second protective pad positioned within the second recess; and the first and second protective pads are adapted to contact a portion of the surface to which the housing is secured.

11. The device as defined in claim 2, further comprising a second rail provided on one of the housing and the movable block and spaced a distance from the rail; and wherein a second recess is defined in the other of the housing and the movable block; and wherein the block moves simultaneously along both the rail and second rail when moving between the first and second positions.

12. In combination a line and a line tensioner; comprising:
    a tensioner configured to have a section of the line reeved therewith wherein said tensioner comprises:
    a housing adapted to be mounted to a surface;
    an idler sheave rotatably mounted in a first location on the housing;
    a traveler sheave rotatably mounted in a second location on the housing;
    a scale operatively engaged with the traveler sheave; and wherein the line is reeved around the idler sheave and the traveler sheave; and wherein the housing includes:
    a block;
    a slot defined within the housing and wherein the block is disposed within the slot and is movable therein between a first position and a second position; and wherein the traveler sheave is mounted on the block and the traveler sheave moves in unison with the block between the first and second positions.

13. The combination as defined in claim 12, wherein the line is reeved sinusoidally around the idler sheave and the traveler sheave.

14. The combination as defined in claim 12, wherein the idler sheave and traveler sheave are aligned along the same plane; and wherein the block moves between the first and second directions in a plane that is substantially parallel to the plane in which the idler and traveler sheaves are disposed.

15. The combination as defined in claim 12, wherein the tensioner includes a mounting member and the mounting member secures the housing to the surface.

16. The combination as defined in claim 12, further comprising:
    a spring disposed within the slot and positioned to be compressed when the block moves from the first position to the second position; and wherein the spring returns to its original shape when the block moves from the second position to the first position.

17. The combination as defined in claim 16; further comprising:
    a plurality of markings provided on an exterior region of the housing; and an indicator operatively engaged with the block on which the traveler sheave is mounted; and wherein the indicator moves in one of the first direction or the second direction relative to the markings when the block and traveler sheave move relative to the housing.

18. The combination as defined in claim 12, further comprising a fishing rod having a handle, a rod tip remote from the handle, and a plurality of eyelets disposed at intervals along the length of the rod between the handle and tip; and
    a reel mounted on the rod handle; wherein a length of line is wound onto the reel; said reel including a lever adapted to adjust drag on the line.

19. The combination as defined in claim 18, wherein the line tensioner is mounted to one of the rod handle; the eyelets of the rod; a fishing rod holder, a wall, or a boat.

20. A method of determining the tension in a line or of fixing the drag of a reel upon which the line is wound, said method comprising the steps of:
    reeving a length of the line around a traveler sheave and an idler sheave of a tensioning device;
    reeling a length of reeved line onto the reel;
    watching an indicator on a scale operatively connective to the traveler sheave as the reeved line is wound onto the reel;
    determining a maximum tension achieved when the reeved line is wound onto the reel from a position of the indicator on the scale so as to not overstress the line;
    comparing the maximum tension achieved with a breaking strain of the reeved line; and
    setting a drag device on the reel to cause the maximum tension to be at or lower than the breaking strain of the line.

21. The method as defined in claim 20, further comprising the step of:
    mounting the tensioning device on a surface.

22. The method as defined in claim 21, wherein the step of mounting the tensioning device includes:
engaging a mounting assembly provided on the housing with one of a fishing rod, an eyelet on a fishing rod, a fishing rod holder, a wall, or a boat.

23. The method as defined in claim 22, wherein the tension or drag is set one of prior to casting the line using the rod; after casting the line using the rod; or while fishing.

* * * * *